United States Patent
Leitao et al.

(10) Patent No.: US 10,776,009 B2
(45) Date of Patent: Sep. 15, 2020

(54) JOURNALING ON AN APPENDABLE NON-VOLATILE MEMORY MODULE

(71) Applicant: International Business Machines Corporation, Armonk, NY (US)

(72) Inventors: Breno H. Leitao, Araraquara (BR); Juscelino Candido de Lima Junior, Campinas (BR); Carlos Eduardo Seo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 16/238,565

(22) Filed: Jan. 3, 2019

(65) Prior Publication Data

US 2020/0218449 A1 Jul. 9, 2020

(51) Int. Cl.
*G06F 13/00* (2006.01)
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
CPC .......................... G06F 16/1805; G06F 16/1815
See application file for complete search history.

(56) References Cited

U.S. PATENT DOCUMENTS

| | | | |
|---|---|---|---|
| 6,330,572 B1 * | 12/2001 | Sitka | G06F 19/321 707/608 |
| 6,606,628 B1 | 8/2003 | Monsen et al. | |
| 10,037,339 B1 * | 7/2018 | Kleinpeter | G06F 16/24552 |
| 10,423,493 B1 * | 9/2019 | Vig | G06F 11/0757 |
| 2006/0136657 A1 | 6/2006 | Rudelic et al. | |
| 2009/0313703 A1 * | 12/2009 | Mao | H04L 63/10 726/27 |

(Continued)

FOREIGN PATENT DOCUMENTS

| CN | 106844177 A | 6/2017 |
|---|---|---|
| CN | 106844184 A | 6/2017 |

OTHER PUBLICATIONS

Chen et al. "Fine-grained metadata journaling on Nvm". Semantic Scholar. 2016 32nd Symposium on Mass Storage Systems and Technologies (MSST). https://www.semanticscholar.org/paper/Fine-grained-metadata-journaling-on-NVM-Chen-Yang/91c9224f1c1b67017632303dc4da43b6392bad4d.

(Continued)

*Primary Examiner* — Sean D Rossiter
(74) *Attorney, Agent, or Firm* — Edward Li

(57) ABSTRACT

A computer-implemented method, a computer program product, and a computer system for journaling on an appendable non-volatile memory module. A kernel receives a request for a write operation of a file on a disk. The kernel instructs a memory management unit to perform an access control list verification. The memory management unit determines whether a user associated with the write operation is permitted to write a filesystem journal onto a non-volatile dual in-line memory module, by performing the access control list verification. The memory management unit writes the filesystem journal onto the non-volatile dual in-line memory module, in response to that the user associated with the write operation is permitted to write the filesystem journal. The kernel writes the file onto the disk.

18 Claims, 4 Drawing Sheets

(56) References Cited

U.S. PATENT DOCUMENTS

| | | | |
|---|---|---|---|
| 2010/0281211 A1* | 11/2010 | Ooigawa | G06F 16/10 711/114 |
| 2016/0342487 A1 | 11/2016 | Ware | |
| 2017/0177447 A1 | 6/2017 | Golander | |
| 2019/0026732 A1* | 1/2019 | Velummylum | G06F 3/0604 |
| 2019/0205191 A1* | 7/2019 | Kleinpeter | G06F 16/1767 |
| 2020/0012568 A1* | 1/2020 | Vig | G06F 16/1815 |
| 2020/0097367 A1* | 3/2020 | Kim | G06F 3/0619 |

OTHER PUBLICATIONS

"Join GitHub today" NVSL/NOVA NOVA: NOn-Volatile memory Accelerated log-structured file system. Latest commit 8834238 on Aug 1, 2017. https://github.com/NVSL/NOVA.

Swanson. "NOVA: a new file system for persistent memory". Aug. 3, 2017. CONTEGIX an Interface to Manage Deployment. https://lwn.net/Articles/729770/.

Swanson. "NOVA: The Fastest File System for NVDIMM" PM Summit. Jan. 18, 2017. San Jose, CA. Seventeen pages. https://www.snia.org/sites/default/files/PM-Summit/2017/presentations/Swanson_steven_NOVA_Fastest_File_system_for_NVDIMMsv2.pdf.

\* cited by examiner

JOURNALING ON AN APPENDABLE NON-VOLATILE MEMORY MODULE

BACKGROUND

The present invention relates generally to a journaling filesystem, and more particularly to journaling on an appendable non-volatile memory module.

A journaling filesystem prevents filesystem corruption by maintaining a journal. The journal is a special file that logs the changes destined for the filesystem in a circular buffer. At periodic intervals, the journal is committed to the filesystem. If a crash occurs, the journal can be used as a checkpoint to recover unsaved information and avoid corrupting filesystem metadata.

A most commonly used journaling filesystem, for example ext3 (or third extended filesystem, which is a journaling filesystem commonly used by the Linux® kernel) and other journaling solutions does not increase performance. The journaling operation drastically reduces the write operation speed, in exchange for the reliability.

SUMMARY

In one aspect, a computer-implemented method for journaling on an appendable non-volatile memory module is provided. The computer-implemented method includes receiving, by a kernel, a request for a write operation of a file on a disk. The computer-implemented method further includes instructing, by the kernel, a memory management unit to perform an access control list verification. The computer-implemented method further includes determining, by the memory management unit, whether a user associated with the write operation is permitted to write a filesystem journal onto a non-volatile dual in-line memory module, by performing the access control list verification. The computer-implemented method further includes writing, by the memory management unit, the filesystem journal onto the non-volatile dual in-line memory module, in response to that the user associated with the write operation is permitted to write the filesystem journal. The computer-implemented method further includes writing, by the kernel, the file onto the disk.

In another aspect, a computer program product for journaling on an appendable non-volatile memory module is provided. The computer program product comprising one or more computer-readable tangible storage devices and program instructions stored on at least one of the one or more computer-readable tangible storage devices. The program instructions are executable to: receive, by a kernel, a request for a write operation of a file on a disk; instruct, by the kernel, a memory management unit to perform an access control list verification; determine, by the memory management unit, whether a user associated with the write operation is permitted to write a filesystem journal onto a non-volatile dual in-line memory module, by performing the access control list verification; write, by the memory management unit, the filesystem journal onto the non-volatile dual in-line memory module, in response to that the user associated with the write operation is permitted to write the filesystem journal; and write, by the kernel, the file onto the disk.

In yet another aspect, a computer system for journaling on an appendable non-volatile memory module is provided. The computer system comprises one or more processors, one or more computer readable tangible storage devices, and program instructions stored on at least one of the one or more computer readable tangible storage devices for execution by at least one of the one or more processors. The program instructions are executable to receive, by a kernel, a request for a write operation of a file on a disk. The program instructions are executable to instruct, by the kernel, a memory management unit to perform an access control list verification. The program instructions are executable to determine, by the memory management unit, whether a user associated with the write operation is permitted to write a filesystem journal onto a non-volatile dual in-line memory module, by performing the access control list verification. The program instructions are executable to write, by the memory management unit, the filesystem journal onto the non-volatile dual in-line memory module, in response to that the user associated with the write operation is permitted to write the filesystem journal. The program instructions are executable to write, by the kernel, the file onto the disk.

DETAILED DESCRIPTION

Figure 1:
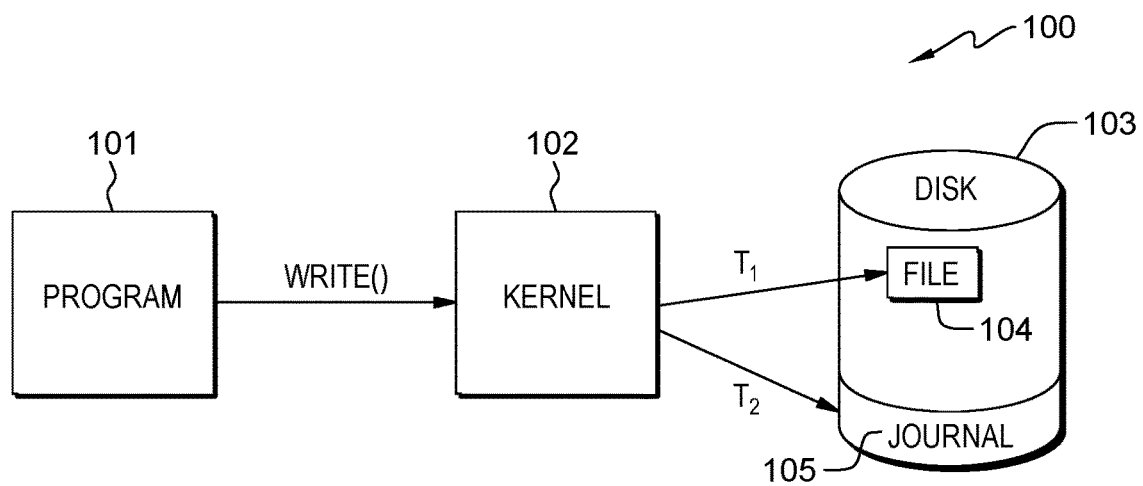
FIG. 1 is a systematic diagram illustrating a current journaling filesystem.

FIG. 1 is a systematic diagram illustrating current journaling filesystem 100. In journaling filesystem 100, kernel 102 is a core of a computer's operating system, disk 103 is a computer readable tangible storage device, such as a hard disk, and program 101 is an application program. Kernel 102 receives from program 101 a write( ) call for writing file 104 onto disk 103. Kernel 102 logs, in journal 105 on disk 103, a disk position of file 104. Then, on disk 103, kernel 102 writes file 104. In current journaling filesystem 100, both journal 105 and file 104 are on disk 103. The time needed in the writing operation includes the time $T_1$ for writing file 104 onto disk 103 and the time $T_2$ for writing journal 105 onto disk 103.

Figure 2:
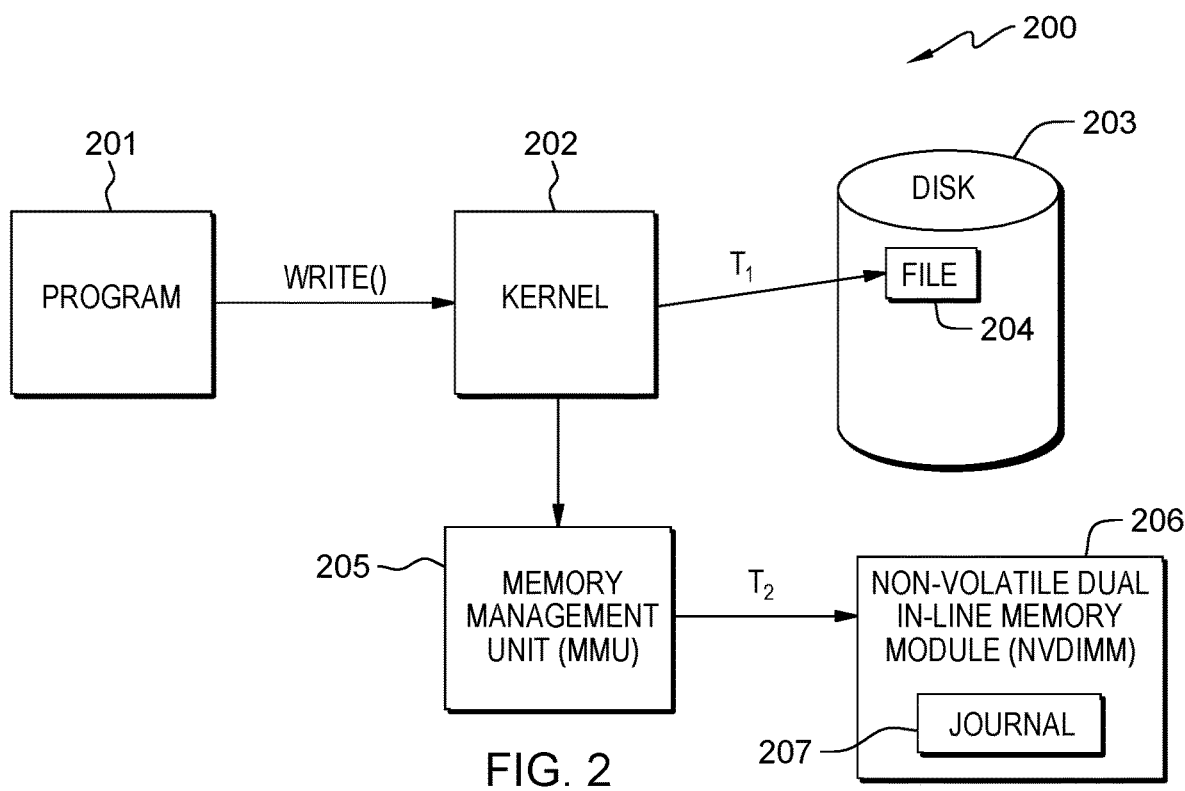
FIG. 2 is a systematic diagram illustrating a journaling filesystem with an appendable non-volatile memory module, in accordance with one embodiment of the present invention.

FIG. 2 is a systematic diagram illustrating journaling filesystem 200 with an appendable non-volatile memory module, in accordance with one embodiment of the present invention. Journaling filesystem 200 comprises non-volatile dual in-line memory module (NVDIMM) 206. Non-volatile dual in-line memory module (NVDIMM) 206 is a type of random-access memory for a computer, and it retains its memory contents even when electrical power is removed. For journaling filesystem 200, the size of NVDIMM 206 may be small (for example, 64k) for storing only journal 207. NVDIMM 206 is memory mapped and cache inhibited.

The present invention can be applied to various architectures where operating systems use filesystems.

Referring to FIG. 2, kernel 202 is a core of a computer's operating system, program 201 is an application program, and disk 203 is a computer readable tangible storage device, such as a hard disk. Memory management unit (MMU) 205 is a computer hardware unit having all memory references passed through itself, primarily performing the translation of virtual memory addresses to physical addresses.

Referring to FIG. 2, kernel 202 receives from program 201 a write( ) call for writing file 204 onto disk 203. Kernel 202 instructs memory management unit (MMU) 205 to perform an access control list (ACL) verification. MMU 205 conducts the ACL verification to determine whether a user is permitted to write journal 207 onto NVDIMM 206. Upon determining that the user is permitted to write journal 207 onto NVDIMM 206, journal 207 will be written onto NVDIMM 206; otherwise, an error will be returned. Kernel 202 determines an address of journal 207 to be written onto NVDIMM 206 and sends to MMU 205 an instruction of the writing operation. MMU 205 writes journal 207 onto NVDIMM 206. Journal 207 includes a disk position of file 204 on disk 203. Kernel 202 writes file 204 onto disk 203.

Referring to FIG. 2, the time needed in the writing operation includes the time $T_1$ for writing file 204 onto disk 203 and the time $T_2$ for writing journal 207 onto NVDIMM 206. Because writing journal 207 onto NVDIMM 206 is faster, the time $T_2$ is decreased, compared to current journaling filesystem 100 shown in FIG. 1. In journaling filesystem 200, journal 207 is mapped to memory instead of residing on disk 203. Therefore, from a CPU standpoint, just a store instruction (write to memory) is necessary to write journal 207. However, in current journaling filesystem 100, a store instruction goes through a side bus for disk 103. Hence, writing journal 207 onto NVDIMM 206 in journaling filesystem 200 is much faster than writing journal 105 onto disk 103 in current journaling filesystem 100. It is important to mention that, in journaling filesystem 200, memory areas mapped to NVDIMM 206 must be cache inhibited.

In the present invention, journaling filesystem 200 leverages a full potential of NVDIMM 206. The present invention has the following advantages. (1) Disk data (file 204) and journal metadata (journal 207) are saved on separated devices (disk 203 and NVDIMM 206). This brings some resilience to the journal data, for example, error-correcting code (ECC) and memory checksum. (2) Updating the journal metadata is much faster than updating the disk data; thus, the whole filesystem change happens up to twice faster if a cacheable NVDIMM is considered. Usually a disk operation is 100× worse (latency-wise) compared to a memory operation. (3) The present invention enhances security. The ACL is no longer in software but in hardware (MMU 205); therefore, a malicious user cannot modify journal 207. With journaling filesystem 200, there is no need for kernel 202 to check the ACL or permission to write journal 207; however, with current journaling filesystem 100 shown in FIG. 1, a permission check has to be done at a kernel level to verify if the user can update journal 105. (4) Journal 207 can be updated using traditional load and store operations, instead of I/O and bus operations. This means it can be cacheable depending on the workload and data nature.

Figure 3:
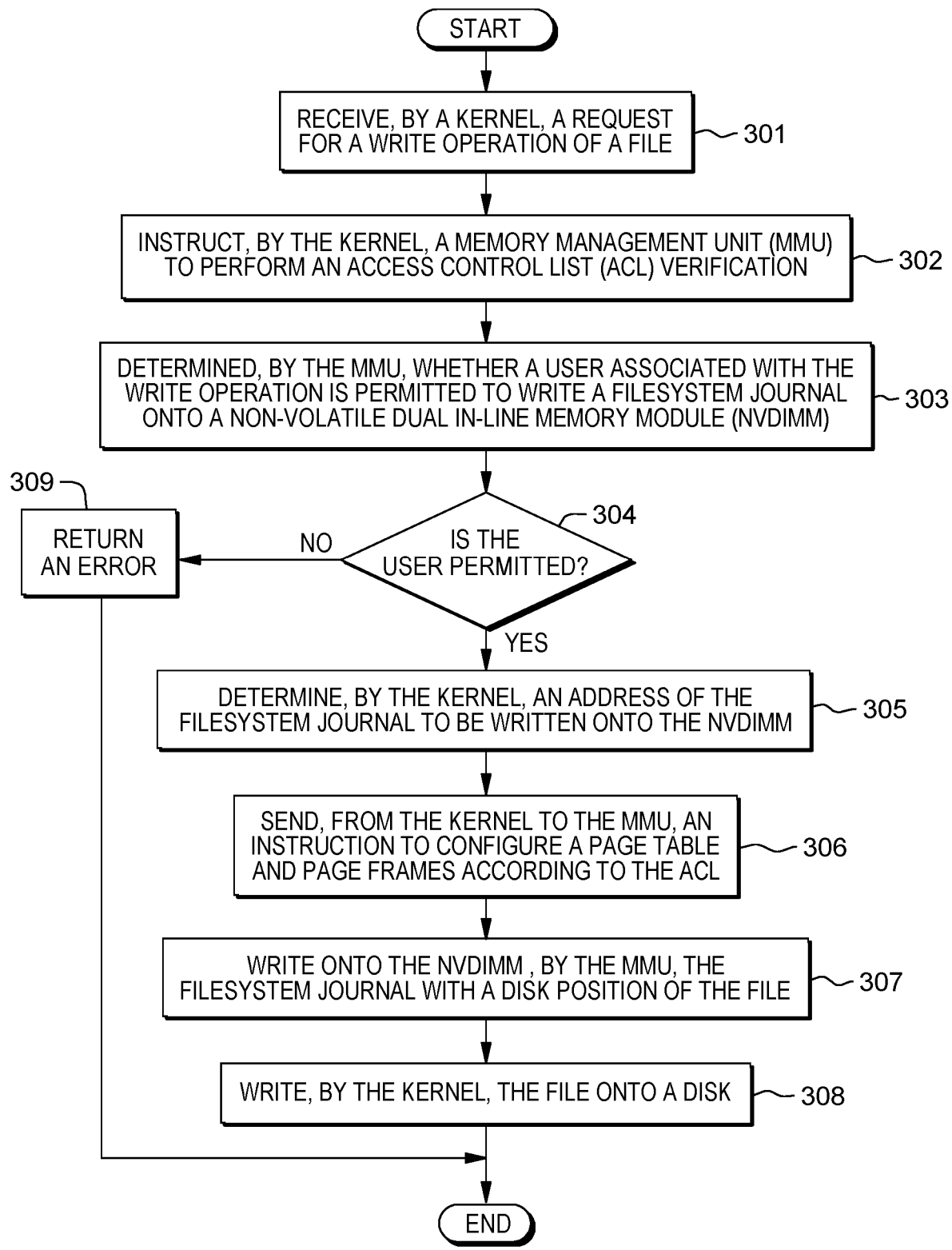
FIG. 3 is a flowchart showing operational steps for journaling on an appendable non-volatile memory module, in accordance with one embodiment of the present invention.

FIG. 3 is a flowchart showing operational steps for journaling on an appendable non-volatile memory module, in accordance with one embodiment of the present invention. At step 301, a kernel receives a request for a write operation of a file on a disk. In the embodiment shown in FIG. 2, kernel 202 receives from program 201 a write( ) call for writing file 204 on disk 203.

Referring to FIG. 3, at step 302, the kernel instructs a memory management unit (MMU) to perform an access control list (ACL) verification. In the embodiment shown in FIG. 2, kernel 202 instructs memory management unit (MMU) 205 to perform the ACL verification. Unlike in current journaling filesystem 100 (shown in FIG. 1) where the ACL is in software, in journaling filesystem 200 with an appendable non-volatile memory module (shown in FIG. 2), the ACL is in hardware (e.g., MMU 205).

Referring to FIG. 3, at step 303, the memory management unit (MMU) determines whether a user associated with the write operation is permitted to write a filesystem journal onto a non-volatile dual in-line memory module (NVDIMM). In the embodiment shown in FIG. 2, MMU 205 determines whether the user is permitted to write journal 207 onto NVDIMM 206.

Referring to FIG. 3, in response to determining the user associated with the write operation is permitted to write the filesystem journal onto the NVDIMM (YES branch of decision block 304), at step 305, the kernel determines an address of the filesystem journal to be written onto the NVDIMM. In the embodiment shown in FIG. 2, kernel 202 determines an address where journal 207 will be written onto NVDIMM 206.

Referring to FIG. 3, in response to determining the user associated with the write operation is not permitted to write the filesystem journal onto the NVDIMM (NO branch of decision block 304), at step 309, the MMU returns an error. As a result, the filesystem journal will not be written onto the NVDIMM and furthermore the file will not be written on the disk. In the embodiment shown in FIG. 2, MMU 205 returns an error; journal 207 will not be written onto NVDIMM 206 and file 204 will not be written onto disk 203.

Referring to FIG. 3, at step 306, the kernel sends to the MMU an instruction to configure a page table and page frames according to the ACL. In the embodiment shown in FIG. 2, kernel 202 sends to MMU 205 the instruction to configure the page table and the page frames.

Referring to FIG. 3, at step 307, the MMU writes onto the NVDIMM the filesystem journal with a position of the file on the disk. In the embodiment shown in FIG. 2, MMU 205 writes journal 207 onto NVDIMM 206. At step 308, the kernel writes the file onto the disk. In the embodiment shown in FIG. 2, kernel 202 writes file 204 onto disk 203. The filesystem journal and the file are written onto separate devices: the filesystem journal (e.g., journal 207) is written onto the appendable non-volatile memory module (e.g., NVDIMM 206), while the file (e.g., file 204) is written on the disk (e.g., disk 203).

Figure 4:
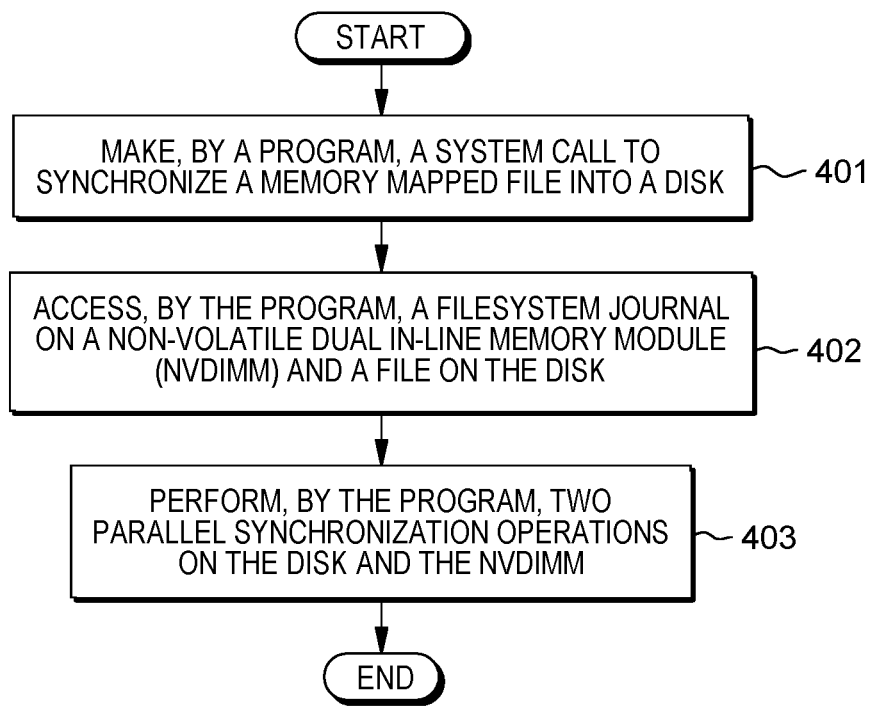
FIG. 4 is a flowchart showing operational steps for synchronizing a memory mapped file into disk in a journaling filesystem with an appendable non-volatile memory module, in accordance with one embodiment of the present invention.

FIG. 4 is a flowchart showing operational steps for synchronizing a memory mapped file into disk in a journaling filesystem with an appendable non-volatile memory module, in accordance with one embodiment of the present invention. At step 401, an application program makes a system call to synchronize a memory mapped file into a disk. In the embodiment shown in FIG. 2, program 201 makes the system call. Usually, if a user wants to synchronize a memory mapped file into a disk, the application program calls msync( ) or fsync( ) for example.

Referring to FIG. 4, at step 402, the application program accesses a filesystem journal on a non-volatile dual in-line memory module (NVDIMM) and a file on the disk. In the embodiment shown in FIG. 2, program 201 accesses journal 207 on NVDIMM 206 and file 204 on disk 203. In current journaling filesystem 100 shown in FIG. 1, program 101 does two disk accesses, one for journal 105 and another one for file 104. However, in journaling filesystem 200 with an appendable non-volatile memory module shown in FIG. 2, msync( ) or fsync( ) will be a parallel operations on disk 203 and on non-volatile dual in-line memory module (NVDIMM) 206. Therefore, the whole synchronization process in journaling filesystem 200 shown in FIG. 2 is much faster than current journaling filesystem 100 shown in FIG. 1, because an NVDIMM access is faster than a disk access.

Referring to FIG. 4, at step 403, the application program performs two parallel synchronization operations, one synchronization operation on the disk and another synchronization operation on the NVDIMM. In the embodiment shown in FIG. 2, program 201 performs two parallel synchronization operations, including one synchronization operation on disk 203 and another synchronization operation on NVDIMM 206.

Figure 5:
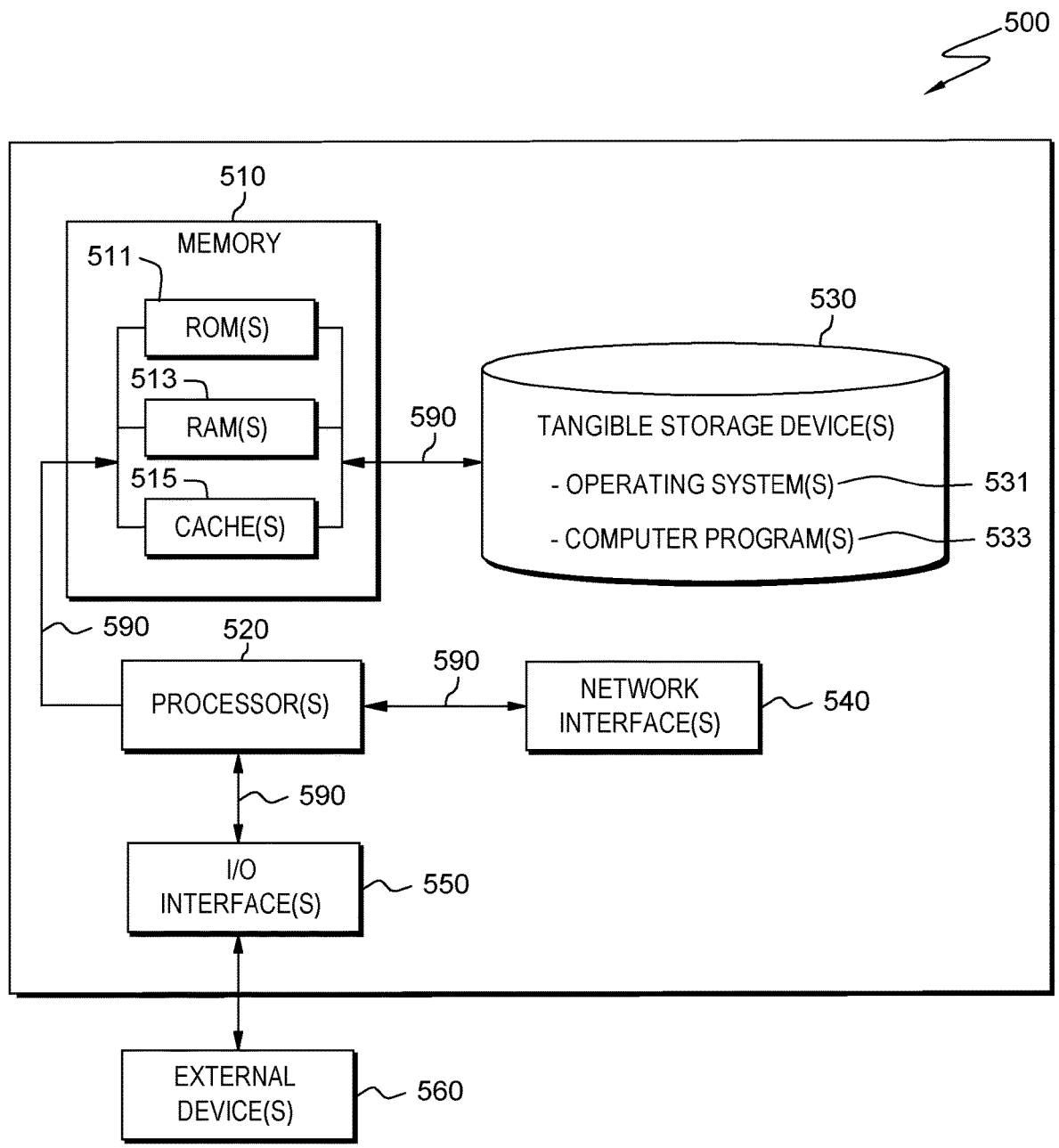
FIG. 5 is a diagram illustrating components of a computing device or a server comprising a journaling filesystem with an appendable non-volatile memory module, in accordance with one embodiment of the present invention.

FIG. 5 is a diagram illustrating components of computing device or server comprising a journaling filesystem with an appendable non-volatile memory module, in accordance with one embodiment of the present invention. It should be appreciated that FIG. 5 provides only an illustration of one implementation and does not imply any limitations with regard to the environment in which different embodiments may be implemented.

Referring to FIG. 5, computing device 500 includes processor(s) 520, memory 510, and tangible storage device(s) 530. In FIG. 5, communications among the above-mentioned components of computing device 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computing device 500 further includes I/O interface(s) 550. I/O interface(s) 550 allows for input and output of data with external device(s) 560 that may be connected to computing device 500. Computing device 500 further includes network interface(s) 540 for communications between computing device 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A computer-implemented method for journaling on an appendable non-volatile memory module, the method comprising:
    receiving, by a kernel, a request for a write operation of a file on a disk;
    instructing, by the kernel, a memory management unit to perform an access control list verification, to
    determining, by the memory management unit, whether a user associated with the write operation is permitted to write a filesystem journal onto a non-volatile dual in-line memory module, by performing the access control list verification;
    writing, by the memory management unit, the filesystem journal onto the non-volatile dual in-line memory module, in response to that the user associated with the write operation is permitted to write the filesystem journal; and
    writing, by the kernel, the file onto the disk.

2. The computer-implemented method of claim 1, further comprising:
    determining, by the kernel, an address of the filesystem journal to be written onto the non-volatile dual in-line memory module.

3. The computer-implemented method of claim 1, further comprising:
    sending to the memory management unit, by the kernel, an instruction to configure a page table and page frames.

4. The computer-implemented method of claim 1, further comprising:
    returning, by the memory management unit, an error, in response to that the user associated with the write operation is not permitted to write the filesystem journal.

5. The computer-implemented method of claim 1, further comprising:
    making, by an application program, a system call to synchronize a memory mapped file into the disk;
    accessing, by the application program, the filesystem journal on the non-volatile dual in-line memory module and the file on the disk; and
    performing, by the application program, two parallel synchronization operations, including one synchronization operation on the disk and another synchronization operation on the non-volatile dual in-line memory module.

6. The computer-implemented method of claim 1, wherein the non-volatile dual in-line memory module is memory mapped and cache inhibited.

7. A computer program product for journaling on an appendable non-volatile memory module, the computer program product comprising one or more computer-readable tangible storage devices and program instructions stored on at least one of the one or more computer-readable tangible storage devices, the program instructions executable to:
    receive, by a kernel, a request for a write operation of a file on a disk;
    instruct, by the kernel, a memory management unit to perform an access control list verification;
    determine, by the memory management unit, whether a user associated with the write operation is permitted to write a filesystem journal onto a non-volatile dual in-line memory module, by performing the access control list verification;
    write, by the memory management unit, the filesystem journal onto the non-volatile dual in-line memory module, in response to that the user associated with the write operation is permitted to write the filesystem journal; and
    write, by the kernel, the file onto the disk.

8. The computer program product of claim 7, further comprising the program instructions executable to:
    determine, by the kernel, an address of the filesystem journal to be written onto the non-volatile dual in-line memory module.

9. The computer program product of claim 7, further comprising the program instructions executable to:
    send to the memory management unit, by the kernel, an instruction to configure a page table and page frames.

10. The computer program product of claim 7, further comprising the program instructions executable to:
    return, by the memory management unit, an error, in response to that the user associated with the write operation is not permitted to write the filesystem journal.

11. The computer program product of claim 7, further comprising the program instructions executable to synchronize a memory mapped file into the disk, synchronizing the memory mapped file into the disk comprising:
    making, by an application program, a system call to synchronize the memory mapped file into the disk;

accessing, by the application program, the filesystem journal on the non-volatile dual in-line memory module and the file on the disk; and performing, by the application program, two parallel synchronization operations, including one synchronization operation on the disk and another synchronization operation on the non-volatile dual in-line memory module.

12. The computer program product of claim 7, wherein the non-volatile dual in-line memory module is memory mapped and cache inhibited.

13. A computer system for journaling on an appendable non-volatile memory module, the computer system comprising:

one or more processors, one or more computer readable tangible storage devices, and program instructions stored on at least one of the one or more computer readable tangible storage devices for execution by at least one of the one or more processors, the program instructions executable to:

receive, by a kernel, a request for a write operation of a file on a disk;

instruct, by the kernel, a memory management unit to perform an access control list verification;

determine, by the memory management unit, whether a user associated with the write operation is permitted to write a filesystem journal onto a non-volatile dual in-line memory module, by performing the access control list verification;

write, by the memory management unit, the filesystem journal onto the non-volatile dual in-line memory module, in response to that the user associated with the write operation is permitted to write the filesystem journal; and write, by the kernel, the file onto the disk.

14. The computer system of claim 13, further comprising the program instructions executable to:

determine, by the kernel, an address of the filesystem journal to be written onto the non-volatile dual in-line memory module.

15. The computer system of claim 13, further comprising the program instructions executable to:

send to the memory management unit, by the kernel, an instruction to configure a page table and page frames.

16. The computer system of claim 13, further comprising the program instructions executable to:

return, by the memory management unit, an error, in response to that the user associated with the write operation is not permitted to write the filesystem journal.

17. The computer system of claim 13, further comprising the program instructions executable to synchronize a memory mapped file into the disk, synchronizing the memory mapped file into the disk comprising:

making, by an application program, a system call to synchronize the memory mapped file into the disk;

accessing, by the application program, the filesystem journal on the non-volatile dual in-line memory module and the file on the disk; and performing, by the application program, two parallel synchronization operations, including one synchronization operation on the disk and another synchronization operation on the non-volatile dual in-line memory module.

18. The computer system of claim 13, wherein the non-volatile dual in-line memory module is memory mapped and cache inhibited.

* * * * *